United States Patent [19]

Klein

[11] 4,096,119

[45] Jun. 20, 1978

[54] POLYMERIZATION OF 2,3,4,5-TETRAHYDRO-4-OXO-1-BENZOXE-PIN-5-ONES

[75] Inventor: Howard P. Klein, Austin, Tex.

[73] Assignee: Texaco Development Corporation, New York, N.Y.

[21] Appl. No.: 708,241

[22] Filed: Jul. 23, 1976

[51] Int. Cl.² .................. C08G 63/08; C08G 63/10
[52] U.S. Cl. .................. 260/47 C; 260/78.3 R
[58] Field of Search .................. 260/47 C, 78.3 R

[56] References Cited

U.S. PATENT DOCUMENTS

| 2,696,481 | 12/1954 | Schneider | 260/47 |
| 3,039,994 | 6/1962 | Gleim | 260/47 |
| 3,849,377 | 11/1974 | Boehmke | 260/49 |

FOREIGN PATENT DOCUMENTS 2,037,017 10/1971 Germany .................. 260/47 C

*Primary Examiner*—Lester L. Lee
*Attorney, Agent, or Firm*—Carl G. Ries; Thomas H. Whaley; Kenneth R. Priem

[57] ABSTRACT

The reaction product of salicylic acid esters and an alkylene oxide may be cyclized into a compound of the general formula:

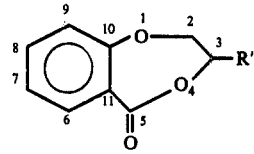

where R' is a radical selected from the group consisting of aryl, aliphatic and hydrogen. Specifically R' may be $C_1$–$C_{10}$ alkyl, halogenated alkyl, alkyl ester, unsaturated aliphatic phenyl, substituted phenyl and hydrogen. These compounds are useful as antirhumatics. The compounds may also be converted into polyol crosslinking agents for polyurethane foams. These compounds may also be polymerized into polyesters by heating with a catalyst. Such a polymerization is a ring opening route and leaves no residue such as is found in condensation polymerization. Depending on the molecular weight attained these polyesters could be used as films, coatings and fibers, for example.

20 Claims, No Drawings

POLYMERIZATION OF 2,3,4,5-TETRAHYDRO-4-OXO-1-BENZOXEPIN-5-ONES

BACKGROUND OF THE INVENTION

This invention concerns cyclizing the reaction product of alkylene oxides and salicylic acid esters and polymerizing the product. German Pat. No. 2,037,017 describes the reaction of alkylene oxides and salicylic acid esters in the presence of amine catalyst to yield compounds of the formula.

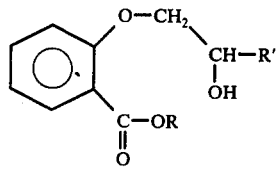

But the German Patent does not disclose cyclizing these compounds. These cyclized compounds may then be polymerized into polyesters.

SUMMARY OF THE INVENTION

My invention is a method for making new compounds. The addition of epoxides to salicylic acid or its esters in the presence of a catalyst produces the intermediate (I), which cyclizes on heating to the compound (II) which may be described as 2,3,4,5-TETRAHYDRO-4-OXO-1-BENZOXEPIN-5-ONE as follows:

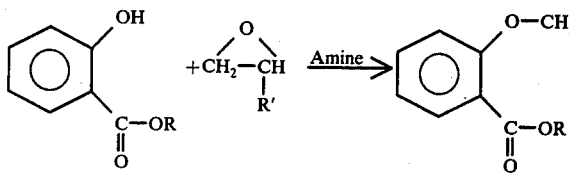

where R is a radical selected from the group consisting of aryl, alkyl or hydrogen. Specifically, R may be $C_1$-$C_3$ alkyl, phenyl or hydrogen. The identity of R is not critical since it is split off in the condensation reaction later. R' is a radical selected from the group consisting of aryl, aliphatic and hydrogen. Specifically R' may be $C_1$-$C_{10}$ alkyl, halogenated alkyl, alkyl ethers unsaturated aliphatic, phenyl, substituted phenyl and hydrogen.

The compound II may be polymerized by heating it in the presence of a catalyst. For example:

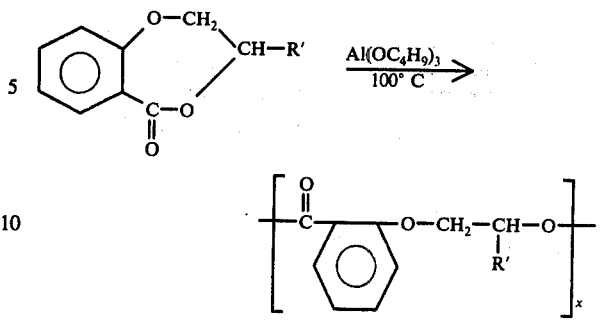

R' is as defined above.

The monomer unit may be repeated a desired number of times depending on the contemplated use for the polyester product. For example, a low molecular weight polyester where X equaled about 3 or 4 would be valuable as a coating. Where X was larger, say several hundred, the polyester may be useful as a fiber. For convenience X may be said to range from 2 to 1000 but the range of X is not critical to the invention.

DESCRIPTION OF THE PREFERRED EMBODIMENTS

The precursors of the polyesters in the process of my invention may be depicted as follows:

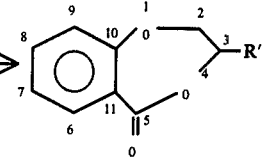

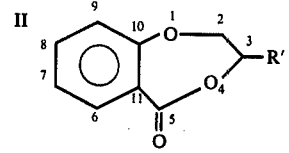

R' is as defined above.

These compounds prepared by reacting salicylic acid or its esters with alkylene oxides in the presence of catalyst to produce the intermediate (I) which is then cyclized to the novel compounds of the invention as follows:

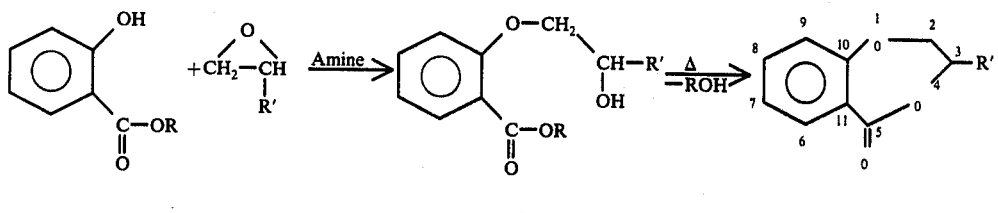

R and R' are as defined above.

It is surprising that the compounds (I) may be converted into the composition II since that it is nowhere disclosed in the art that such a ring closure will take place.

Salicylic acid or its esters which are useful in my invention include those where R is as defined above.

The compounds may be polymerized into polyesters in a novel process by heating II in the presence of a catalyst as follows, for example:

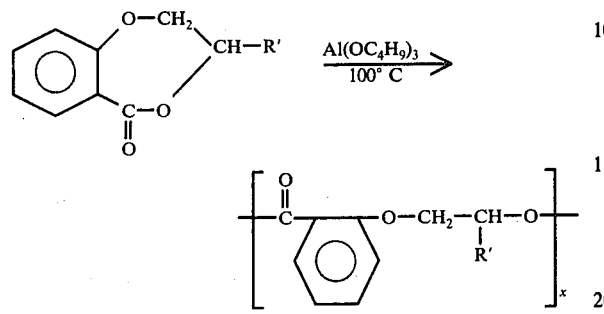

where X is from 2 to 1000 and R' is as defined above especially including hydrogens, methyl, ethyl and propyl.

The organic oxides useful in my invention include ethylene oxide, propylene oxide and butylene oxide, styrene oxide, epichlorohydrin, cyclohexene oxide, allyl glycidyl ether, phenyl glycidal ether. It is especially preferred to use ethylene oxide, propylene oxide and butylene oxide.

The catalyst for the reaction between the organic oxide and the acid or esters may be triethylamine or sodium acetate. Other catalysts which are useful in my invention include N-methyl morpholine, N-ethyl morpholine, dimethyl piperazine, triethylenediamine, potassium acetate, potassium octoate and the like.

The catalyst used to polymerize the compounds may be any which will open lactone rings. Specifically alkali metals, very basic catalysts such as metal alcoholates are useful as well as metal hydrides. Examples are aluminum sec-butoxide, aluminum isopropoxide, titanium isopropoxide, sodium methoxide, potassium test-butoxide, lithium hydride and dialkyl zinc. Other catalysts will be apparent to those skilled in the art.

Although there is no intention to limit the scope of my claims the following operating conditions are considered useful. For the reaction between the salicylic acid esters and the alkylene oxide a temperature range of about 80° to 250° C is recommended. For this reaction a pressure range of between 15 to 150 PSI is recommended.

For the cyclization of the product of the reaction between the alkylene oxide and the salicylic acid esters the temperature range is recommended to be between 80° and 250° C. For this cyclization the pressure is recommended to be between 15 and 150 PSI.

The reaction conditions for polymerizing the novel precursor of the invention may vary to a large degree. It is preferred to operate below the boiling point of the precursor in order to maintain atmospheric pressure. However, the temperatures must be high enough to initiate the reaction even if this means operating at super atmospheric pressures. Therefore without limiting the scope of the invention the suggested temperature range is from about 0° to 300° C and the suggested pressure range is from about 1 to 10 atmospheres.

The following examples illustrate the preparation of the compound of my invention as well the use of these compounds as intermediates in preparation of polyol and polyesters.

EXAMPLE #1

PREPARATION OF 2,3,4,5-TETRAHYDRO4-OXO-1-BENZOXEPIN-5-ONE (V)

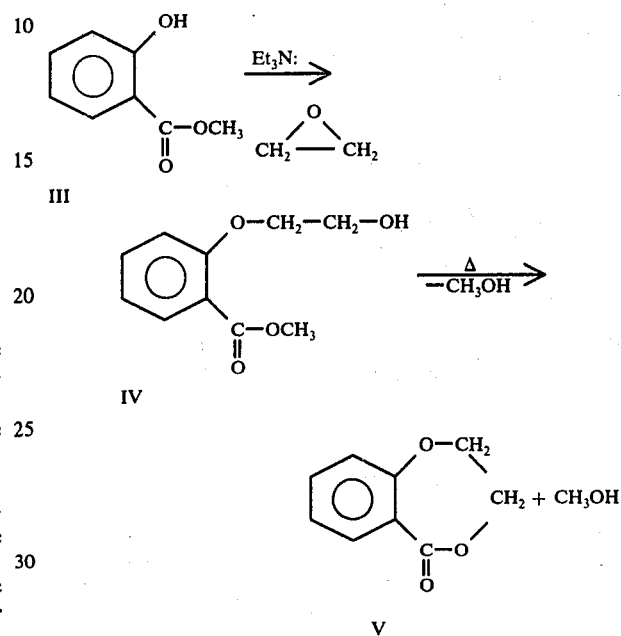

To a one liter, stainless steel autoclave was added 608 g (4.0 moles) of methyl salicylate (III) and 6.0 g. of triethylamine. The reactor was heated to a temperature of 120° C and pressure of 40–70 PSI while 200 g. (4.5 moles) of ethylene oxide was added over an eight hour period. After this time, the dark reaction product (777 g.) was removed from the autoclave.

The crude reaction was fractionally distilled through a 3 ft. packed (Goodloe) column. About 45 g. of methanol was removed at atmospheric pressure up to a temperature of 150° C in the flask. Higher vacuum removed traces of methanol and catalyst. The main fraction, 443 g., B.P. 140°–147° C/1.0 mm., was identified (NMR, IR & GLC) as 96% of the title compound (V). The main impurity was identified as the intermediate (IV). Aproximately150 g. of viscous, black residue remained in the distillation flask. It was later determined to be a low molecular weight polymer of V.

EXAMPLE #2

PREPARATION OF 3-METHYL-2,3,4,5-TETRAHYDRO-4-OXO-1-BENZOXEPIN-5-ONE (VII)

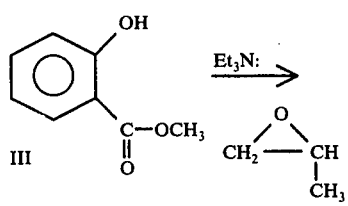

-continued

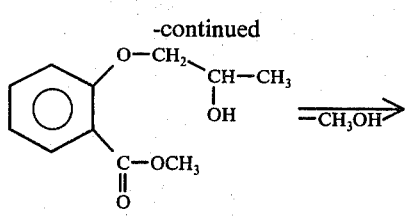

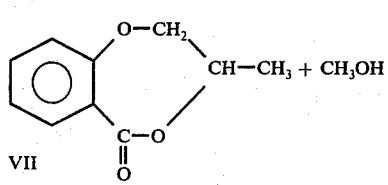

-continued

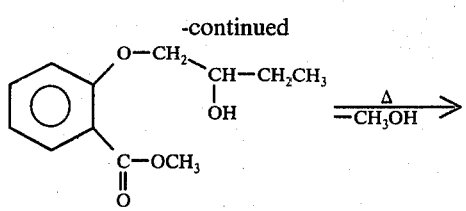

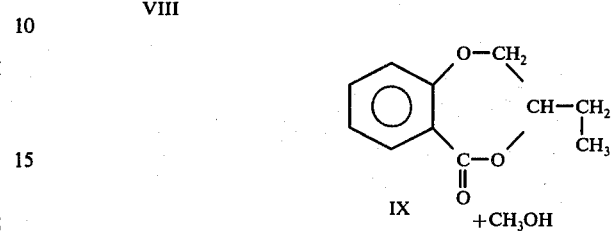

To a one liter, stainless steel autoclave was added 535 g. (3.52) of methyl salicylate (III) and 6.0 g. triethylamine. The resulting mixture was heated at 120° C, while 260 g. (4.5 moles) of propylene oxide was added over a one hour period. The reaction mixture was then heated up to 150° C and allowed to digest for 8 hr.

The mobile, clear, reddish, crude product was removed from the reactor and fractionally distilled through a one ft. Vigreaux (sic) column. After removal of a small amount of glycol ether, the main fraction, 450 g., B.P. = 110°–115° C/0.25 mm., was removed. The heartcut of this fraction (248 g.) was identified (IR, NMR and GLC) as 99.5% of the title compound (VII). A minor impurity was identified as (VI). About 110 g. of undistillable residue remained in the distillation flask.

To a one liter autoclave was added a mixture of 304 g. (2.0 moles) methyl salicylate (III), 4.0 g. triethylamine and 150 g. (2.1 mole) of 1,2-butylene oxide. The reaction mixture was heated under nitrogen at 150° C for 6 hours. The clear brown liquid crude reaction product (444 g.) was then removed from the autoclave and fractionally distilled (4489-84 and 4524-25) through a 3 ft. Vigreaux (Goodloe packed) column after addition of 2 g. sodium acetate to aid hydrolysis. Traces of glycol and catalyst (Et N) were removed at first, but the main fraction (4524-25), 160 g. was identified (NMR, IR) as the pure title compound IX. On standing in air IX solidified and could be recrystallized from cyclohexane as prisms, m.p. 63°–66° C.

EXAMPLE #3
PREPARATION OF 3-ETHYL-2,3,4,5-TETRAHYDRO-4-OXO-1-BENZOXEPIN-5-ONE (IX)

EXAMPLE #4
DIAMIDEDIOL(XI) FROM 3-METHYL-2,3,4,5-TETRAHYDRO-4-OXO-BENZO-XEPIN-5-ONE (VII)

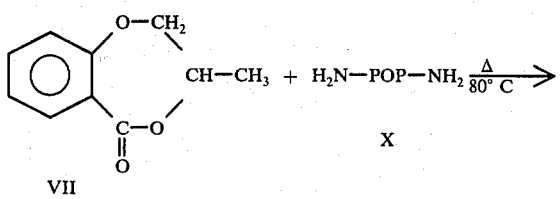

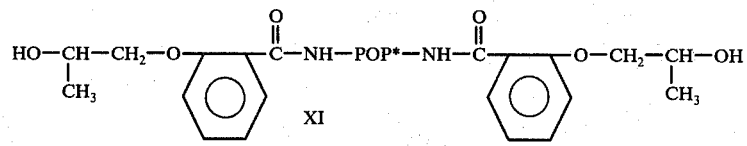

To a 500 ml. flask, fitted with a stirrer, thermometer and addition funnel, was added 107 g. (0.25 mole) of a 400 molecular weight polyoxypropylene diamine (X), which was stirred under nitrogen at 25° C while 89 g. (0.50 mole) of 3-methyl-2,3,4,5-tetrahydro-4-oxo-1-benzoxepin-5-one (VII) was added over a 15 minute period. No real exotherm was observed on addition, so the mixture is heated on up 150°–160° C for 6–7 hours. After this period the product is light yellow viscous liquid giving the following analysis:

Anal. Hydroxyl No. = 148 (145 calc.) Viscosity (25° C) = 25,500 cps (Brookfield) Total Amine 0.62 meq./g.
The structure of XI is confirmed by NMR & IR. ΔPOP = Polyoxypropylene

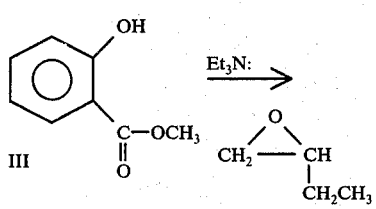

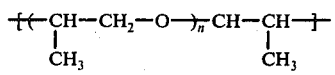

EXAMPLE #5

POLYMERIZATION OF 3-METHYL-2,3,4,5-TETRAHYDRO-4-OXO-1-BENZO-XEPIN-5-ONE (VII)

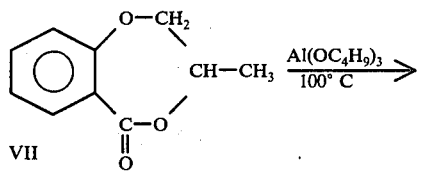

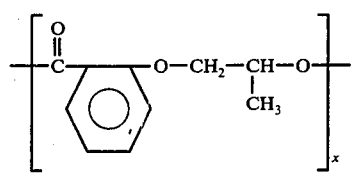

To a 50 ml. flask, fitted with a vacuum-seal stopcock and magnetic stirring bar, was added 20.0 g. (0.113 mole) of 3-methyl-2,3,4,5-tetrahydro-4-oxo-1-benzoxepin-5-one (VII) and 0.2 g. (1.0% by wt.) of aluminum sec-butoxide. The resulting cloudy mixture was stirred and evacuated down to 0.1 mm Hg. The stopcock was closed and the flask immersed into a 100° C oil bath for 24 hours. The resulting polymer product was a viscous liquid and consisted (GPC) of 50% monomer VII and 50% of the polymer XII (IR, NMR). The average molecular weight of the mixture was 308.

what is claimed:

1. A method for making a polymer having the repeating monomer unit

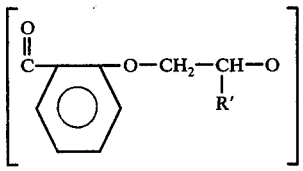

where R' is a radical selected from the group consisting of aryl, aliphatic and hydrogen; which comprises heating a compound of the formula

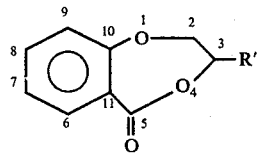

in the presence of a catalyst which will open lactone rings at a temperature sufficient to initiate ring opening.

2. A method as in claim 1 wherein R' is hydrogen.
3. A method as in claim 1 wherein R' is methyl.
4. A method as in claim 1 wherein R' is ethyl.
5. A method as in claim 1 wherein a basic catalyst is employed.
6. A method as in claim 5 wherein the catalyst is a metal alcohoate.
7. A method as in claim 5 wherein the catalyst is aluminum sec-butoxide.
8. A method as in claim 1 wherein the temperature is below the boiling point of the lactone precursor at the pressure employed.
9. A method as in claim 1 wherein R' is methyl, the catalyst is aluminum sec-butoxide and the temperature is about 100° C at atmospheric pressure.
10. A method for making a polymer having the repeating monomer unit

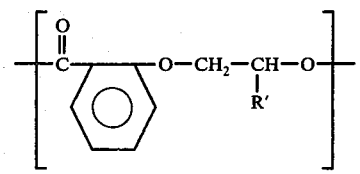

where R' is a radical selected from the group consisting of $C_1$–$C_{10}$ alkyl, halogenated alkyl, alkyl ether, unsaturated aliphatic and phenyl which comprises heating a compound of the formula

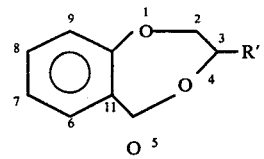

in the presence of a catalyst which will open lactone rings at a temperature sufficient to initiate ring opening.

11. A method for making a polymer having the repeating monomer unit

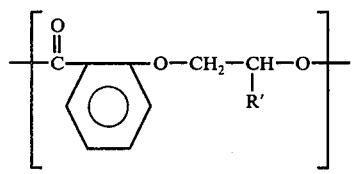

where R' is a radical selected from the group consisting of aryl, aliphatic and hydrogen which comprises heating a compound of the formula

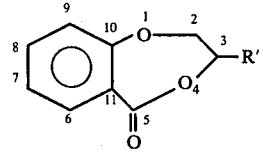

in the presence of a catalyst selected from the group consisting of alkali metals, metal alcoholates and metal hydrides which will open lactone rings at a temperature sufficient to initiate ring opening ranging from about 0° to 300° C and a pressure from about 1 to 10 atmospheres.

12. A method as in claim 11 wherein R' is hydrogen.
13. A method as in claim 11 wherein R' is methyl.

14. A method as in claim 11 wherein R' is ethyl.

15. A method as in claim 11 wherein a basic catalyst is employed.

16. A method as in claim 15 wherein the catalyst is a metal alcohoate.

17. A method as in claim 15 wherein the catalyst is aluminum sec-butoxide.

18. A method as in claim 11 wherein the temperature is below the boiling point of the lactone precursor at the pressure employed.

19. A method as in claim 11 wherein R' is methyl, the catalyst is aluminum sec-butoxide and the temperature is about 100° C at atmospheric pressure.

20. A method for making a polymer having the repeating monomer unit

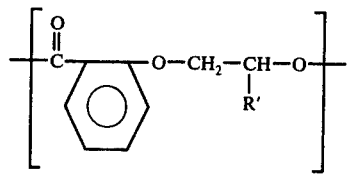

where R' is a radical selected from the group consisting of $C_1$-$C_{10}$ alkyl, halogenated alkyl, alkyl ether, unsaturated aliphatics and phenyl which comprises heating a compound of the formula

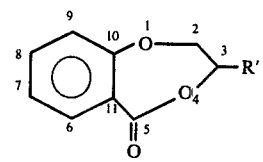

in the presence of a catalyst selected from the group consisting of alkali metals, metal alcoholates and metal hydrides which will open lactone rings at a temperature sufficient to initiate ring opening ranging from about 0° to 300° C and a pressure from about 1 to 10 atmospheres.

* * * * *